Feb. 2, 1971 R. WISOTZKY ET AL 3,560,284
METHOD OF MAKING FOAM-BACKED TUFTED CARPET
Filed Dec. 4, 1967
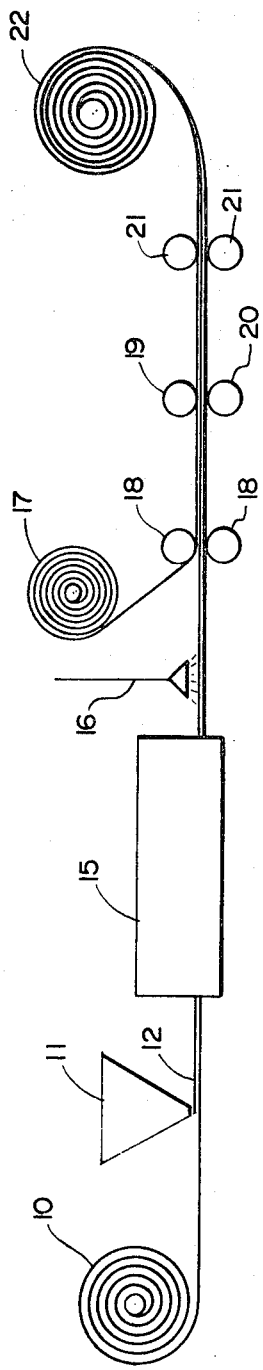
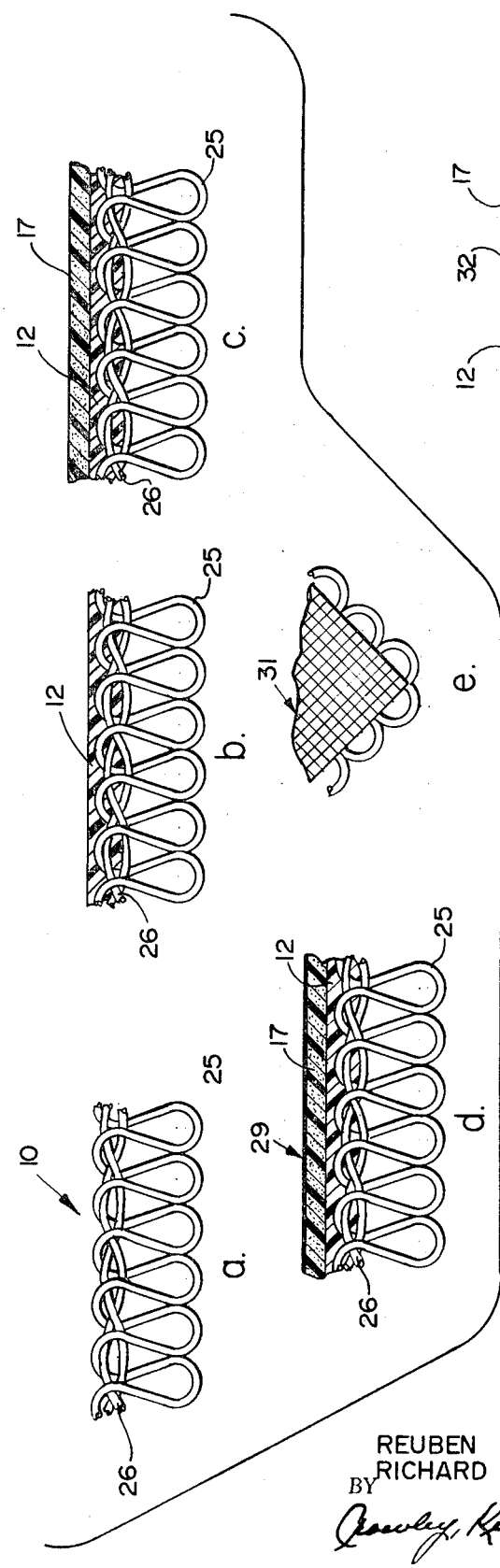
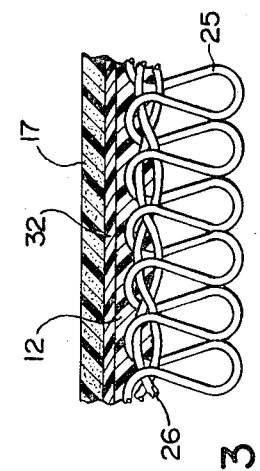
INVENTORS
REUBEN WISOTZKY
RICHARD E. PETERSEN
BY
*Crowley, Kiely & Stevens*
ATTORNEY

United States Patent Office 3,560,284
Patented Feb. 2, 1971

3,560,284
METHOD OF MAKING FOAM-BACKED TUFTED CARPET
Reuben Wisotzky, Lexington, and Richard E. Petersen, Concord, Mass., assignors to Pandel, Inc., Lowell, Mass., a corporation of Massachusetts
Filed Dec. 4, 1967, Ser. No. 687,608
Int. Cl. D05c *15/03*
U.S. Cl. 156—72                    19 Claims

ABSTRACT OF THE DISCLOSURE

Tufted rugs and carpeting having a thermoplastic backing, e.g. a closed cell foam backing, are prepared by applying a heat-sensitive plastisol composition to the back of a material composed of tufted yarns in a thermoplastic base fabric, fusing the plastisol composition to bind the base fabric and tufted yarns together, and then laminating the thermoplastic sheet to the plastisol layer using the plastisol layer as the sole source of a sensible heat to melt the thermoplastic sheet and bond it to the plastisol layer.

BACKGROUND OF THE INVENTION

This invention relates to improved tufted rugs and carpets and, more particularly, to the tufted carpets having closed-cell foam backings integrally associated therewith and a process of preparing such rugs and carpets.

Tufted rugs and carpets are manufactured by threading pile yarns e.g. by needling, through a backing or base fabric to form pile loops. The base fabrics are woven, non-woven or combinations of woven and non-woven fabrics. In the past the backings have been composed of cotton duck or jute but now the empolyment of synthetic backing material composed of thermoplastic yarns such as a polyolefins, preferably polypropylene, polyamides, polyesters and polyacrylics are coming into prominence.

Generally, the backing and pile loops are locked together by the application of a binder, for example natural and/or synthetic polymeric latices. A foam backing to provide cushioning and non-skid effects is applied in the form of a foamable latex composition which either is applied unfoamed and then foamed in place by means of blowing agents or by first foaming the latex composition, as by aeration, and then applying it to the backing and then gelling and curing the foam.

The foamed carpeting prepared in this manner, while satisfactory for many uses, is generally unsatisfactory for outdoor use or for use in situations where moisture may contact the carpeting, since the foam is of the open-cell type which will receive and retain moisture. Such open-cell foam structures are also undesirable when the carpeting is adhesively secured to flooring. Deterioration of the foam through chemical action with the adhesives often occurs or the foam has insufficient internal strength to permit the removal of the carpeting from the floor without delamination of the foam.

Closed-cell foams have been adhesively secured to backings in the past; however, the adhesives available for such purposes are unsatisfactory in that an insufficiently strong bond is formed. Delamination of the foam and the backing occurs too readily. Because of the thermoplastic nature of the base fabric, the use of heat-sealing techniques is undesirable because of the possibilty of excessive shrinkage of the base fabric or even melting the base fabric resulting in damage to the tufted portion of the carpet.

A method has now been found for producing an integral carpet having a closed-cell foam backing which is not subject to the deficiencies of the prior art.

SUMMARY OF THE INVENTION

The present invention is directed to forming an integral carpet structure by a method which includes bonding the tufted yarn loops to a thermoplastic backing fabric with a plastisol composition and then heat-sealing a thermoplastic backing sheet, preferably a closed cell foam, to the plastisol coating. More specifically, the method involves applying a heat-sensitive plastisol composition to the back of a thermoplastic base fabric to which are attached tufted yarns. Heat is the applied to the plastisol coating in order to fuse the plastisol to bond the tufted yarns which are loosely attached to the base fabric. After the tufted yarns and the base fabric are locked together, additional heat is applied to the surface of the plastisol. A relatively cold thermoplastic sheet i.e. a solid sheet, or, preferably, a closed-cell foam, is contacted with the heated plastisol surface. The temperature of the plastisol surface is sufficient to melt the contacting surface of the thermoplastic sheet, thereby bonding the thermoplastic sheet to the plastisol layer creating an integral structure.

It should be noted that the application of heat throughout the process is to the plastisol layer; first to fuse it, thereby locking the tufted yarns and the base fabric, and secondly, to provide the sole source of sensible heat to the relatively cold thermoplastic sheet to provide the heat sealing of the thermoplastic sheet to the tufted structure. Therefore, in the preparation of the carpet, according to the present invention a temperature gradient exists from the outer edges inward wherein the outer portions, i.e., the tufted yarns and the thermoplastic sheet are relatively cold in relation to the plastisol layer.

After the formation of the carpet, if a closed-cell foam is employed as the thermoplastic sheet, the outer surface of the foam is preferably densified to impart further strength to the carpet. This densification is achieved by applying heat and pressure to the outer surface of the foam thereby melting and collapsing the outer surface to provide a thickened skin. The thickness of the thus-formed skin can be varied in the discretion of the operator depending upon the degree of strength desired. Preferably the degree of densification employed is 3 to 5% of the initial thickness of the foam. In a particularly preferred embodiment, in addition to the densification of the foam, the foam is embossed, for example in a waffle-like pattern to provide for greater non-slip characteristics and for better adhesion when used with flooring adhesives.

A radiant energy reflective coating may be applied to one surface of the thermoplastic base fabric. This reflective coating may be applied prior to the application of the tufted yarns into the base fabric or after such tufted yarns have been inserted. The application of a radiant energy reflective coating to the thermoplastic base fabric prior to the application of the heat-sensitive plastisol composition and the subsequent fusing and heating steps provides still greater protection to the thermoplastic base fabric which is normally subject to shrinkage and/or melting.

Conventional radiant energy reflective compositions may be employed satisfactorily. Preferably metallic compositions, such as those containing aluminum, or white or light colored compositions are employed. The particular radiant energy reflective composition should be selected with regard to the plastisol composition to ensure that adhesion problems between the plastisol and base fabric don't arise. The radiant energy reflective surface may be applied by any conventional method known to the art, for example spraying, casting, roller coating and, particularly in the case of metal, vacuum deposition or sputter deposition. It should be noted that it is not critical that a continuous heat-reflective layer be formed.

In a particularly preferred method an aluminum-pigmented vinyl ink is employed.

Accordingly, the alternative embodiment of preparing the improved integral tufted pile carpets includes the steps of applying a radiant energy reflective surface to at least one surface of a thermoplastic base fabric and needling tufting yarns into the base fabric on the side of said base fabric opposite that which carries the radiant energy reflective surface. The tufting operation may be carried out either before or after the application of the radiant energy reflective surface. Preferably it is carried out after the reflective surface is applied. The base fabric is then coated with a plastisol composition which is fused to bond the tufted yarns to the base fabric. The outer surface of the plastisol composition is then treated with a high energy heat source to impart sufficient sensible heat to the top surface of the plastisol compostiion to melt a thermoplastic sheet when said sheet is placed in contact with said surface thus providing the improved integral tufted carpet of the present invention.

BRIEF DESCRIPTION OF THE DRAWINGS

FIG. 1 is a schematic illustration of the novel process of the present invention.

FIG. 2 (a) to (e) illustrates cross-sectional views of enlarged fragmentary materials at various steps of the process shown in FIG. 1.

FIG. 3 is a cross-sectional fragmentary view of alternative material prepared in an embodiment of the present invention.

DESCRIPTION OF THE PREFERRED EMBODIMENT

Tufted material 10 composed of loops 25 secured to base fabric 26 is coated with heat-sensitive plastisol 12 from reservoir 11. The product is then heated in oven 15 to fuse the plastisol and secure the tufted loops to the base fabric. The coated material then passes under high intensity heat source 16 to impart sufficient sensible heat to the plastisol coating to provide a heat seal to the relatively cool closed-cell foam layer 17 thereby adhering said foam to the plastisol layer as the foam and coated material pass through pressure rolls 18. Optionally, embossing roll 19 is employed with pressure roll 20 to densify the outer surface 29 of the closed-cell foam and to emboss a pattern 31, such as a waffle-like pattern, on the outer surface of the foam.

Cooling rolls 21 are also optionally employed before the finished carpet 22 is rolled.

In FIG. 3 a cross-sectional portion of a carpet is shown wherein a radiant energy reflective layer 32 is applied to the base fabric after the application of the plastisol coating composition.

The tufted yarns suitable for employment in the present invention comprise any of the conventional materials, for example, wool, cotton, nylon, acrylic, modacrylic and the like.

The base fabric to which the tufted yarns are applied comprise woven or non-woven webs of thermoplastic yarns or fibers. As examples of suitable thermoplastic materials mention may be made of polyolefins, such as polypropylene and polyethylene, polamides, polyesters, polyacrylics, vinyls such as vinyl chloride, and the like. Combinations of thermoplastic webs with other textile yarns such as cotton, jute, rayon and paper are also employed.

The plastisol is preferably polyvinyl chloride or a vinyl chloride copolymer. In a preferred embodiment low molecular weight, dispersion grade resin is employed. In a particularly preferred embodiment a vinyl chloride/ vinyl acetate copolymer is employed wherein the vinyl acetate component of the copolymer is in the range of 5 to 15% by weight. If desired, conventional plasticizers such as dioctyl phthalate are employed. Plasticizers are employed at a level of 60 to 120 parts of plasticizer per 100 parts of resin on a weight basis. Preferably 90 parts of plasticizer per 100 parts of resin is employed. A particularly preferred composition is as follows:

| | Parts by wt. |
|---|---|
| Dispersion grade resin copolymer (90 parts vinyl chloride, 10 parts vinyl acetate) | 90 |
| Dioctyl phthalate | 90 |
| Epoxidized soy bean oil | 5 |
| Barium-cadmium stabilizer | 3 |
| Thickener (silica aerogel) | 5 |

The viscosity of the plastisol composition should be such that it will flow sufficiently to fill in the interstices between the tufted yarns and the fibers of the base fabric to lock the tufted yarns to the base fabric. No loss of resiliency in the carpet results from the filling of the interstices because of the termoplastic nature of the plastisol. The plastisol also covers the outer fibers of the base fabric sufficiently to prevent the excessive melting or shrinkage of the base fabric. If desired, thickening agents conventionally employed with plastisols are employed to prevent the excessive penetration of the plastisol into the base fabric and through to the outer surface of the tufted loops. It is necessary, however, that the viscosity of the plastisol be selected so that sufficient penetration be achieved to bond the tuft yarns to the base fabric and that sufficient plastisol be retained on the outer surfaces of the base fabric to permit the bonding of the base fabric to the termoplastic sheet.

In a particularly preferred embodiment, the plastisol is applied in at least two applications wherein the first application is employed to lock the tufted yarns to the base fabric and fill the interstices, and the second, of a considerably higher viscosity is employed to be held on the outer surfaces of the base fabric to provide the bonding of the base fabric to the thermoplastic sheet.

The thermoplastic sheet is employed to provide strength and lay-flat, particularly if the carpeting is to be cemented to the flooring. Preferably the thermoplastic sheet is a closed-cell foam such as a polyvinylchloride foam or a polyurethane foam. The density of the thermoplastic sheet employed ranges from 10 pounds per cubic foot to up to a solid sheet. Preferably, a foam having a density of 20 pounds per cubic foot is is employed. The coating weight of the thermoplastic layer is generally 1 to 4 pounds per square yard preferably 2 pounds per square yard with a thickness of 0.050 to 0.300 inches, preferably 0.150 inches.

In the present invention the plastisol is applied by conventional means, for example, by doctor blade, by spraying, by roller coating, or by extrusion. Because of the viscosity of the material, a doctor blade is preferably employed in applying a plastisol composition.

After the application of the plastisol, heat is applied to the side of the structure upon which the plastisol has been coated in order to fuse the plastisol, thus locking the tufted yarns to the base fabric and, at the same time, protecting the thermoplastic components of the base fabric from excessive shrinkage or melting. It is not necessary to heat the entire structure in order to fuse the plastisol, in fact, it is preferable that the heat be applied only to the plastisol coating. Accordingly, even though an oven or some such source of heat is employed, the heat is directed only to that side of the structure on which the plastisol is located. After the plastisol has been fused, heat from a high intensity heat source, such as infra-red lamps or a flame, is applied to the surface of the plastisol to raise the temperature sufficiently to melt the thermoplastic sheet when it contacts the plastisol layer, thus forming the bond. The temperature of the plastisol coating is preferably in excess of 350° F., more preferably 400° F. at the time of lamination. It should be noted that the thermoplastic sheet is not heated nor is the tufted pile side of the structure heated. The temperature of the materials other than the surface of the plastisol is preferably maintained as cool as possible e.g. below 200° F. Where a closed-cell foam is employed, the application of heat is especially to be avoided since excessive heat can cause the collapse of the foam.

Densification and embossing of the thermoplastic layer are achieved through contacting the layer with a heated roll which partially melts the outer surface to provide a 3 to 5% reduction in the thickness.

The novel process of the present invention can be employed with both a solid sheet of thermoplastic material and a closed-cell foam backing material. Closed-cell foam is particularly preferred since the method of this invention is the only method which permits the heat-sealing of a heat-sensitive backing element to a synthetic thermoplastic base fabric. Since the thermoplastic backing sheet is pre-formed it can be colored to match the color of the tufted yarns so that damage or wear to the carpet surface will expose a material of the same color thereby making the damage or wear unobvious whereas in a rug employing, for example, latices, the different color of the latex backing material would be readily apparent.

Other attempts to secure closed-cell foams to carpeting have been less than satisfactory since conventional adhesives are not satisfactory particularly where the carpet is to be cemented to flooring. Closed-cell foam backing also cannot be achieved by an in-situ foaming process.

In still another embodiment the back of the base fabric carrying the tufted yarns is contacted under pressure with a thermoplastic sheet, while, at the same time a plastisol composition is introduced between said base fabric and said thermoplastic sheet. The adhesive which is fluid when heated, will penetrate the base fabric to lock the tufted yarns to said base fabric and, at the same time melt and bond the thermoplastic sheet to the base fabric. In this alternate embodiment it should be noted that the only heat in the process is applied to the plastisol composition and that the tufted portion and thermoplastic sheet are relatively cool. If desired, a pre-coat of plastisol composition is applied to the base fabric to bond the yarns to the base.

In the finished product the strength of the heat seal is such that any attempt to separate the foam from the fabric base results in delamination of the foam and not in the destruction of the bond provided by the heat sealing.

What is claimed is:

1. A method for preparing an integral tufted pile carpet, which method comprises:
   (a) applying a vinyl chloride resin plastisol composition onto the back surface of a thermoplastic backing sheet, which sheet comprises a pile face surface of tufted yarns in a thermoplastic base fabric;
   (b) heating the plastisol composition to fuse the composition and to bond the tufted yarns of the back surface to the thermoplastic base fabric, while maintaining the temperature of the thermoplastic base fabric below the shrinkable temperature thereof.
   (c) heating the surface of the fused plastisol composition to impart sensible heat to the fused plastisol composition;
   (d) contacting one surface of a thermoplastic resin foam sheet to the surface of the heated plastisol composition; and
   (e) melting and bonding a portion of the foam surface of the foam sheet in contact with the heated plastisol composition, substantially all of the heat for the melting of the foam surface provided by the sensible heat of the heated plastisol composition in contact with the foam sheet, thereby bonding the foam sheet to the fused plastisol composition.

2. The method of claim 1 which includes forming a thick skin of thermoplastic material on the back surface of the foam sheet and embossing a skid-resistant pattern on such back surface.

3. The method of claim 1 wherein the thermoplastic sheet comprises a substantially closed cell thermoplastic foam sheet.

4. The method of claim 1 wherein the thermoplastic foam sheet is selected from the group consisting of vinyl chloride resin foam and a urethane resin foam.

5. The method of claim 1 which includes heating the back surface of the thermoplastic foam sheet to melt and collapse the surface to provide a thickened outer skin thereon.

6. The method of claim 1 wherein heat is applied directly and solely to the exposed surface of the plastisol composition to fuse the composition.

7. The method of claim 1 which includes maintaining, during the bonding steps, a temperature gradient between the heated surface of the fused plastisol composition and the cool back surface of the foam sheet and the cool pile face of the carpet.

8. The method of claim 1 which includes coating a first plastisol composition onto the back surface of the thermoplastic backing sheet to fill in the interstices between the base fabric and the tufted yarn loops; and thereafter, coating onto said first plastisol composition a second plastisol composition of higher viscosity, the second plastisol composition to bond to the surface of the thermoplastic sheet.

9. The method of claim 1 wherein the temperature of the tufted yarns and the base fabric is maintained below about 200° F. during fusing of the plastisol composition.

10. The method of claim 1 wherein the temperature of the surface of the fused plastisol composition at the time of bonding the surface of the foam thermoplastic sheet is in excess of about 350° F.

11. The method of claim 1 wherein sensible heat is imparted to the fused plastisol composition by directing heat from a high intensity heat source toward the surface of the fused plastisol composition.

12. The method of claim 1 which includes applying a radiant energy reflective surface to the back surface of the thermoplastic backing sheet prior to coating onto said back surface the plastisol composition.

13. The method of claim 1 wherein heating the surface of the fused plastisol is accomplished without heating the pile surface of the tufted yarn.

14. A method for preparing an integral tufted pile carpet, which method comprises:
   (a) applying a radiant energy reflective surface to the back surface of a thermoplastic backing sheet, which backing sheet comprises a pile face of tufted yarns in a thermoplastic base fabric;
   (b) coating a vinyl chloride basin plastisol composition onto the radiant energy reflective surface;
   (c) fusing the plastisol composition to bond the tufted yarns to the thermoplastic base fabric;
   (d) heating the surface of the fused plastisol composition to impart sensible heat to the fused plastisol composition; and
   (e) bonding the surface of a foam thermoplastic sheet to the surface of the heated plastisol composition by melting a portion of the foam surface of the thermoplastic sheet, substantially all of the heat for melting of such surface provided by the sensible heat of the plastisol composition.

15. The method of claim 14 wherein sensible heat is imparted to the plastisol composition by directing heat from an infrared lamp toward the surface of the fused plastisol composition.

16. The method of claim 14 wherein the thermoplastic sheet is a thermoplastic closed cell foam sheet.

17. The method of claim 14 wherein the radiant energy reflective surface is applied to the base fabric prior to applying the tufted yarns to the thermoplastic base fabric.

18. The method of claim 14 wherein the radiant energy reflective surface is applied by coating the back surface of a thermoplastic backing sheet with an aluminum pigmented vinyl composition.

19. A method for preparing an integral tufted pile carpet, which method comprises:
(a) applying a vinyl chloride resin plastisol composition onto the back surface of a thermoplastic backing sheet, which sheet comprises a pile face surface of tufted yarns in a thermoplastic base fabric;
(b) heating the plastisol composition to fuse the composition and to bond the tufted yarns of the back surface to the thermoplastic base fabric, while maintaining the temperature of the thermoplastic base fabric below the shrinkable temperature thereof;
(c) heating only the surface of the fused plastisol composition to impart sensible heat to the fused plastisol composition by directing heat from a high intensity heat source toward the surface of the fused plastisol composition;
(d) contacting one surface of a substantially closed-cell vinyl chloride resin foam sheet to the surface of the heated plastisol composition;
(e) melting and bonding at least a portion of the foam surface of the foam sheet in contact, substantially all of the heat for the melting of the foam surface provided by the sensible heat of the heated plastisol composition in contact with the foam sheet;
(f) heating the back surface of the closed-cell foam sheet to a temperature sufficient to melt and collapse the back surface and foam a thickened noncellular skin thereon; and
(g) embossing a skid-resistant design pattern into the thickened outer skin of the foam sheet.

References Cited
UNITED STATES PATENTS

| | | | |
|---|---|---|---|
| 3,010,180 | 11/1961 | Hoffman | 161—62X |
| 3,075,865 | 1/1963 | Cochran | 156—148X |
| 3,238,595 | 3/1966 | Schwartz et al. | 28—74 |
| 3,264,167 | 8/1966 | Sands | 161—62 |
| 3,383,259 | 5/1968 | Cochran | 156—148 |
| 3,441,464 | 4/1969 | Blue | 156—148 |
| 3,457,135 | 7/1969 | Slington | 156—148 |

BENJAMIN R. PADGETT, Primary Examiner

G. G. SOLYST, Assistant Examiner

U.S. Cl. X.R.

156—148, 435; 161—66